United States Patent
Ito et al.

(10) Patent No.: US 7,325,851 B2
(45) Date of Patent: Feb. 5, 2008

(54) POWER SEAT SLIDE APPARATUS FOR A VEHICLE

(75) Inventors: Sadao Ito, Anjo (JP); Makoto Sakai, Kariyai (JP); Eiichiro Tsuji, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 99 days.

(21) Appl. No.: 11/399,267

(22) Filed: Apr. 7, 2006

(65) Prior Publication Data

US 2006/0226674 A1 Oct. 12, 2006

(30) Foreign Application Priority Data

Apr. 8, 2005 (JP) ............... 2005-112669

(51) Int. Cl.
*B60N 2/07* (2006.01)

(52) U.S. Cl. ............... 296/65.13; 296/65.15; 297/344.1; 248/429

(58) Field of Classification Search .. 296/65.13–65.15; 297/344.1, 344.11; 248/429; 74/89.28
See application file for complete search history.

(56) References Cited

U.S. PATENT DOCUMENTS

| 5,048,886 | A | * | 9/1991 | Ito et al. ................ 296/65.14 |
| 5,797,293 | A | * | 8/1998 | Chaban ................... 74/89.36 |
| 6,244,660 | B1 | * | 6/2001 | Yoshimatsu ............ 297/344.1 |
| 6,290,199 | B1 | * | 9/2001 | Garrido et al. ............ 248/424 |
| 6,464,421 | B1 | * | 10/2002 | Kiefer ..................... 403/21 |
| 6,511,032 | B1 | * | 1/2003 | Lee ....................... 248/429 |
| 6,971,620 | B2 | * | 12/2005 | Moradell et al. ......... 248/422 |
| 2006/0186687 | A1 | * | 8/2006 | Kimura et al. ........... 296/65.13 |
| 2006/0237987 | A1 | * | 10/2006 | Nakamura et al. ....... 296/65.13 |

FOREIGN PATENT DOCUMENTS

| EP | 1 331 131 A1 | 7/2003 |
| GB | 2 193 629 A | 2/1988 |
| JP | 6-336130 A | 12/1994 |
| JP | 2883804 | 2/1999 |
| WO | 98/26951 A1 | 6/1998 |

OTHER PUBLICATIONS

European Search Report dated Apr. 19, 2007.

* cited by examiner

*Primary Examiner*—Dennis H. Pedder
*Assistant Examiner*—Greg Blankenship
(74) *Attorney, Agent, or Firm*—Buchanan Ingersoll & Rooney PC

(57) ABSTRACT

A power seat slide apparatus includes: a housing fixedly mounted on the first rail and possessing a reverse U-shaped cross section projecting upwardly with an upper wall, which forms an upper surface of the reverse U-shaped cross section, and first and second sidewalls, which forms side surfaces of the reverse U-shaped cross section. The housing further includes a notch defined by a first notch end surface of the upper wall and a second notch end surface of the first and second sidewalls. A nut member is fitted into the notch of the housing, supported inside the housing, and is held tight in the longitudinal direction of the vehicle by the first notch end surface and the second notch end surface. A screw shaft is freely rotatably supported by the second rail and is engaged with the nut member.

20 Claims, 6 Drawing Sheets

POWER SEAT SLIDE APPARATUS FOR A VEHICLE

CROSS REFERENCE TO RELATED APPLICATIONS

This application is based on and claims priority under 35 U.S.C. §119 with respect to Japanese Patent Application 2005-112669, filed on Apr. 8, 2005, the entire content of which is incorporated herein by reference.

FIELD OF THE INVENTION

This invention generally relates to a power seat slide apparatus for a vehicle.

BACKGROUND

A known power seat slide apparatus for a vehicle, which is disclosed in for example Japanese Patent No. 2883804, includes a lower rail fixedly mounted on a floor of a vehicle and an upper rail freely slidably supported by the lower rail and supporting a seat of the vehicle. The lower rail has an internal space, which extends in a longitudinal direction of a vehicle, and an opening, which opens or releases an upper portion of the internal space. This power seat slide apparatus further includes a metal-made housing and a resin-made nut member, a screw shaft, and a driving mechanism. The metal-made housing is fitted into the internal space of the lower rail via the opening and is secured to the lower rail. The resin-made nut member is housed inside the housing. The screw shaft extends along the longitudinal direction inside the internal space and is screwed together with the nut member by being freely rotatably supported by the upper rail. The driving mechanism is supported by the upper rail and drives the screw shaft to rotate.

In the above-described power seat slide apparatus, the screw shaft can be rotated relative to the nut member in response to activation of the driving mechanism. Because the screw shaft is screwed together with the nut member, the upper rail can be slidably moved in the longitudinal direction relative to the lower rail secured to the vehicle floor. Therefore, a longitudinal position of the vehicle seat relative to the vehicle floor can be adjusted.

In FIG. 9, the power seat slide apparatus is denoted with a reference numeral 101, the housing is denoted with a reference numeral 143, the screw shaft is denoted with a reference numeral 141, and the nut member is denoted with a reference numeral 142. The housing 143 is press-molded so as to form a sac like structure opening upwardly. A bottom wall 143a of the housing 143 is secured to the lower rail. A reference numeral 149 in FIG. 9 represents a shock-absorbing member.

A load (hereinafter, referred to as a forward impact seat load), which is generated at a time when a vehicle crashes ahead, or a load (hereinafter, referred to as a rearward impact seat load), which is generated at a time when a vehicle is impacted from a rearward, is transmitted, in this order, to the upper rail, the screw shaft 141, the nut member 142, the shock-absorbing member 149, the housing 143 and the lower rail. However, in the power seat slide apparatus 101, because the housing 143 is designed so as to form a sac like structure, a seat load, which is transmitted from the nut member 142 to the housing 143, is subjected to a front wall 143b and a rear wall 143c, of the housing 143, as denoted with an arrow in FIG. 9. Therefore, in order to assure a certain degree of strength of the housing 143, it is necessary to increase a wall thickness of the housing 143 itself. A width dimension W of the housing 143 (a lateral direction of the vehicle) may be enlarged in response to expansion of the wall thickness.

In the above-described circumstances, the internal space of the lower rail has to be enlarged in the lateral direction of the vehicle, which may leads to enlarging the lower rail and the upper rail and to an increase in weight and cost of the power seat slide apparatus.

Moreover, as described above, because the housing 143 is inserted into the internal space of the lower rail via the opening, a lateral dimension of the opening of the lower rail has to be enlarged in response to an increase in the width dimension W of the housing 143. If the kind of power seat slide apparatus is mounted on the vehicle, an appearance of the lower rail may become worse, and foreign substances may easily drop into the internal space of the lower rail.

A need thus exists to provide a power seat slide apparatus for a vehicle, in which a lower rail and an upper rail are downsized, an appearance of the lower rail is enhanced, and foreign substances is restrained from dropping easily into an internal space of the lower rail.

SUMMARY OF THE INVENTION

According to an aspect of the present invention, a power seat slide apparatus for a vehicle Includes: a first rail fixedly mounted on a floor of a vehicle and extending in a longitudinal direction of the vehicle; a second rail fixed to a seat and slidably supported by the first rail; a housing fixedly mounted on the first rail and possessing a reverse U-shaped cross section projecting upwardly with an upper wall, which extends in the longitudinal direction of the vehicle and forms an upper surface of the reverse U-shaped cross section, and first and second sidewalls, which extend from a right side, and a left side, of the upper wall along the longitudinal direction of the vehicle and forms side surfaces of the reverse U-shaped cross section, the housing further including a notch defined by a first notch end surface of the upper wall and a second notch end surface of the first and second sidewalls; a nut member fitted into the notch of the housing and supported inside the housing, the nut member being held tight in the longitudinal direction of the vehicle by the first notch end surface of the upper wall and the second notch end surface of the first and second sidewalls; a screw shaft extending above the first rail along the longitudinal direction of the vehicle, the screw shaft being freely rotatably supported by the second rail and being engaged with the nut member; and a driving mechanism operatively associated with the second rail so as to rotate the screw shaft. The screw shaft is rotated relative to the nut member in response to an operation of the driving mechanism, and the second rail is slidably moved in the longitudinal direction of the vehicle relative to the first rail when the screw shaft, which is engaged with the nut member, is rotated.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings. Power seat slide apparatus 1 can be mounted on a front seat for a vehicle V, for example. Longitudinal, lateral and vertical directions of the power seat slide apparatus 1 are based on those directions of the vehicle V. Arrows for the longitudinal, lateral and vertical directions in the FIGS. represent an orientation of the power seat slide apparatus 1 mounted on the vehicle V.

First Embodiment

Figure 1:
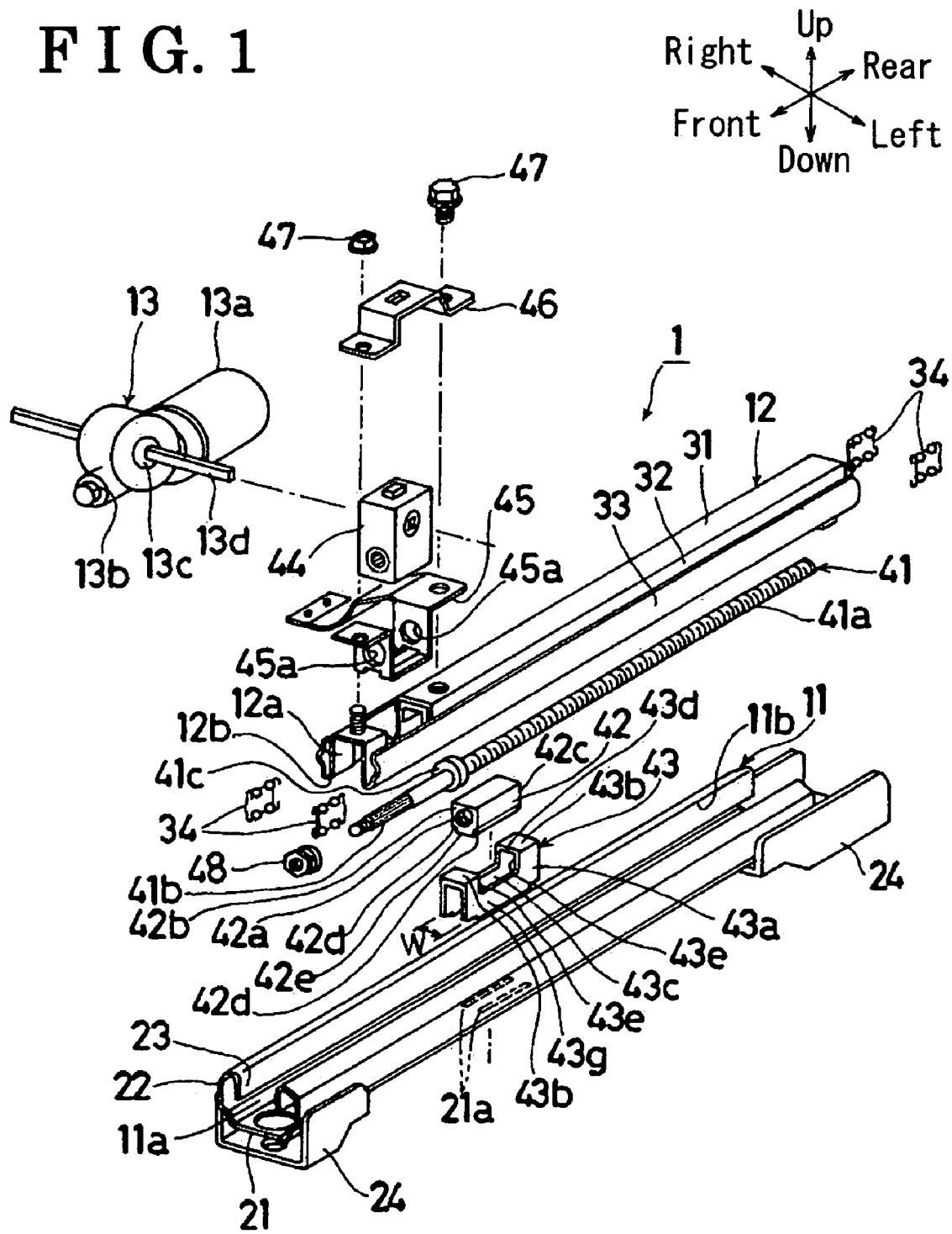
FIG. 1 is an exploded perspective view illustrating a power seat slide apparatus for a vehicle according to a first embodiment of the present invention.

The power seat slide apparatus 1 according to the first embodiment of the present invention can be preferably mounted, making a lateral pair, on a floor 2 (FIG. 2) of the vehicle V. More particularly, the power seat slide apparatus 1, which is one of the pair, is positioned at a right side under a seat 3 in a lateral direction of the vehicle V, while the power seat slide apparatus 1, which is the other one of the pair, is positioned at a left side under the seat 3. In order to simplify the description and illustration, of the seat slide apparatus 1, FIG. 1 illustrates only one seat slide apparatus 1 which is mounted at the left side under the seat S, and the description will be exhibited only for the seat slide apparatus 1 at the left side of the seat S. It is, however, to be understood that both seat slide apparatus 1 possess the same general configuration and so the description below applied to both seat slide apparatus 1.

As illustrated in FIG. 1, the power seat slide apparatus 1 is mainly configured with a lower rail 11 (i.e., a first rail), an upper rail 12 (i.e., a second rail) and a driving mechanism 13. The driving mechanism 13 is used both by the power seat slide apparatus 1 positioned at the left side under the seat 3 and the power seat slide apparatus 1 positioned at the right side thereof.

The lower rail 11 extends in a longitudinal direction of the vehicle V. The lower rail 11 can possess a U-shaped cross section with a bottom wall 21 and a pair of sidewalls 22 extending upwardly from left and right ends of the bottom wall 21. Flange portions 23 are formed at upper ends of the sidewalls 22 and bent inwardly. The lower rail 11 hence can possess an internal space 11a, which is defined with the pair of sidewalls 22 and the bottom wall 21 and extends in the longitudinal direction, and an opening 11b, which releases in the longitudinal direction an upper portion of the internal space 11a. The lower rail 11 is fixedly mounted on the floor 2 of the vehicle V via brackets 24 that is riveted to the bottom wall 21.

The upper rail 12 extends in the longitudinal direction. The upper rail 12 can possess a reversed U-shaped cross section with an upper wall 31 and a pair of sidewalls 32 extending downwardly from left and right ends of the upper wall 31. Flange portions 33 are formed at lower ends of the sidewalls 32 and bent outwardly. The upper rail 12 hence can posses an internal space 12a, which is defined with the pair of sidewalls 32 and the upper wall 31 and extends in the longitudinal direction, and an opening 12b, which releases in the longitudinal direction a lower portion of the internal space 12b. The upper rail 12 is secured to the seat 3 of the vehicle V via brackets (not illustrated) riveted to the upper wall 31.

Figure 4:
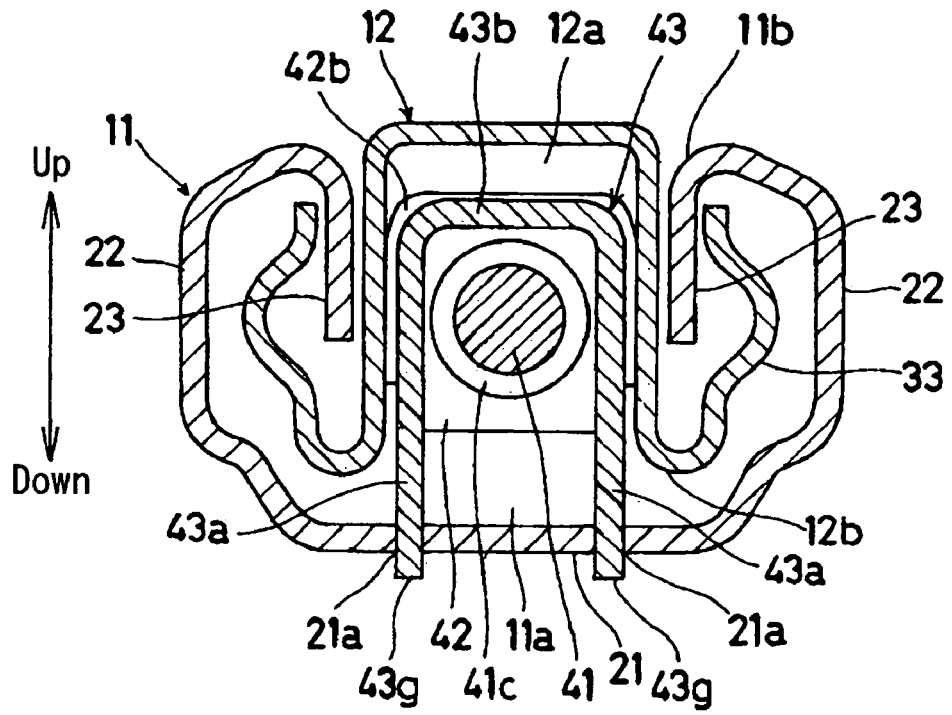
FIG. 4 is a sectional view illustrating an assembly of a lower rail and an upper rail, both of which are illustrated in FIG. 1.

As is apparent from FIG. 4, the flange portions 33 of the upper rail 12 are engaged with the flange portions 23 of the lower rail 11 via sliding members 34. Therefore, the upper rail 12 is supported by the lower rail 11 so as to freely slide in a longitudinal direction of the upper rail 12, which corresponds to the longitudinal (back-and-forth) direction of the vehicle V and is slidably movable back-and-forth inside the internal space 11a of the lower rail 11.

The driving mechanism 13 is mainly configured with a screw shaft 41, a nut member 42 and a gear unit 44. The nut member 42 is formed with a threaded portion 42a (female screw) that is screwed together with a threaded portion 41a (male screw) of the screw shaft 41.

The screw shaft 41 extends within the internal space 11a and 12a along the longitudinal direction. A front end of the screw shaft 41 is freely rotatably supported by the upper wall 31 of the upper rail 12. The nut member 42, which is screwed together with the threaded portion 41a of the screw shaft 41, is made of resin, e.g., 66 nylon containing an additive of glass fiber. The housing 43 is formed by press-forming metal material. As illustrated in FIG. 1, the housing 43 can be inserted into the internal space 11a of the lower rail 11 via the opening 11b and is fixed to the bottom wall 21 of the lower rail 11, whereby the housing 43 supports the nut member 42 therein. Comparing with a nut member made of a metal, the resin-made nut member 42 can contribute to reducing a manufacturing cost.

Figure 5:
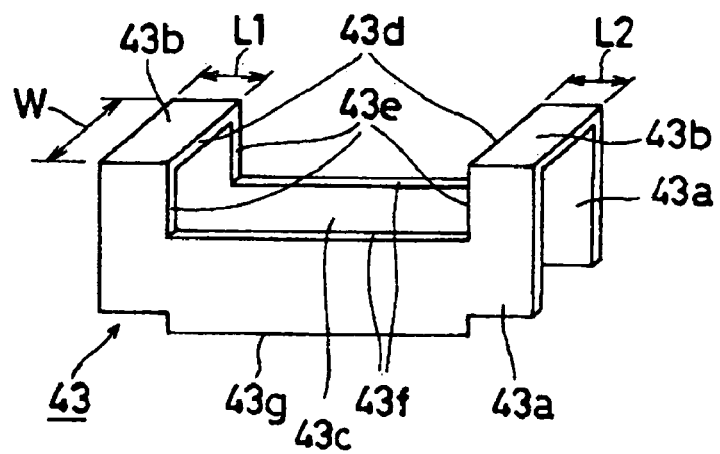
FIG. 5 is a perspective view illustrating a housing.

As illustrated in FIGS. 4 and 5, the housing 43 possesses a reverse U-shaped cross section projecting towards the upper wall 31 of the upper rail 12. The housing 43 includes a pair of sidewalls 43a (i.e., a first sidewall, a second sidewall) and an upper wall 43b, the pair of sidewalls 43a which extend longitudinally and configure side surfaces of the reverse U-shaped cross section, and the upper wall 43b which longitudinally and configures a U-shaped valley (a bottom surface of the U-shaped cross section), i.e., an upper surface of the reverse U-shaped cross section. The housing 43 forms the above described reverse U-shaped cross section with a single plate member that is press-formed. Inside of the U-shaped housing 43, there are the nut member 42 and the screw shaft 41 accommodated.

The housing 43 further includes a notch 43c which is defined at the upper wall 43b and the sidewalls 43a. End surfaces of the upper wall 43b and the sidewalls 43a can be referred to as notch end surfaces for defining the notch 43c. The end surfaces of the upper wall 43b, which extend laterally, are respectively denoted with a reference numeral 43d, the end surfaces of the sidewalls 43a, which extend vertically, are respectively denoted with a reference numeral 43e, and the end surfaces of the sidewalls 43a, which extend longitudinally, are respectively denoted with a reference numeral 43f.

The nut member 42, which exhibits an approximately box-shaped structure, is fitted into the notch 43c and is held tight between the notch end surfaces 43d and 43e. Therefore, the nut member 42 can be supported by the housing 43, more particularly, by the notch end surfaces 43d and 43e, in the longitudinal direction. That is, because at least one of a front surface 42b, and a rear surface 42c, of the nut member 42 comes in contact with the notch end surfaces 43d and 43e, the nut member 42 can be supported so as not to move longitudinally relative to the housing 43. Further, according to the first embodiment of the present invention, because a lateral dimension of the nut member 42 is slightly greater than a lateral dimension of the housing 43, the nut member 42 can be supported by the housing 43 with high reliability, in other words, the front surface 42b, and the rear surface 42c, of the nut member 42 come in contact with the notch end surfaces 43d and 43e with high reliability. Alternatively or in addition, because a contact portion 42d, which is defined at a bottom surface of the nut member 42 so as to form a step pattern, comes in contact with the notch end surfaces 43f, the nut member 42 can be supported so as not to move vertically relative to the housing 43. Still alternatively or in addition, because a protrusion 42e, which projects from the bottom surface of the nut member 42, is fitted into a space defined by the sidewalls 43a of the housing 43, the nut member 42 is supported so as not to move laterally relative to the housing 43.

At a lower end portion of at least one of the sidewalls 43a of the housing 43, at least one welded portion 43g is defined, which is inserted into at least one through hole 21a defined at the bottom wall 21 of the lower rail 11. According to the first embodiment of the present invention, there are welded portions 43g at end portions of both the sidewalls 43a of the housing 43. The welded portions 43g are inserted into two through holes 21a defined at the bottom wall 21 of the lower rail 11. The housing 43 can be therefore fixed to the lower rail 11 by the welded portions 43g, which are inserted into the through holes 21a, by being welded to the bottom wall 21 of the lower rail 11, as illustrated in FIG. 4.

According to the first embodiment of the present invention, preferably, a wall thickness of the housing 32 can be approximately equal to, and greater than, 1.6 mm and approximately equal to, and smaller than 3.2 mm. Moreover, preferably, a longitudinal dimension of a portion (i.e., a first portion) denoted with a reference numeral Li in FIG. 5 can be approximately equal to, and greater than 5 mm and approximately equal to, and smaller than 20 mm. In other words, the longitudinal dimension of the portion L1 can be within a range from approximately 5 mm to 20 mm, inclusive. Likewise, preferably, a longitudinal dimension of a portion (i.e., a second portion) denoted with a reference numeral L2 in FIG. 5 can be approximately equal to, and greater than 5 mm and approximately equal to, and smaller than 20 mm. In other words, the longitudinal dimension of the portion L2 can be within a range from approximately 5 mm to 20 mm, inclusive. That is, according to the first embodiment of the present invention, the longitudinal dimension of the portion L1 can be substantially the same as the longitudinal dimension of the portion L2.

Figure 2:
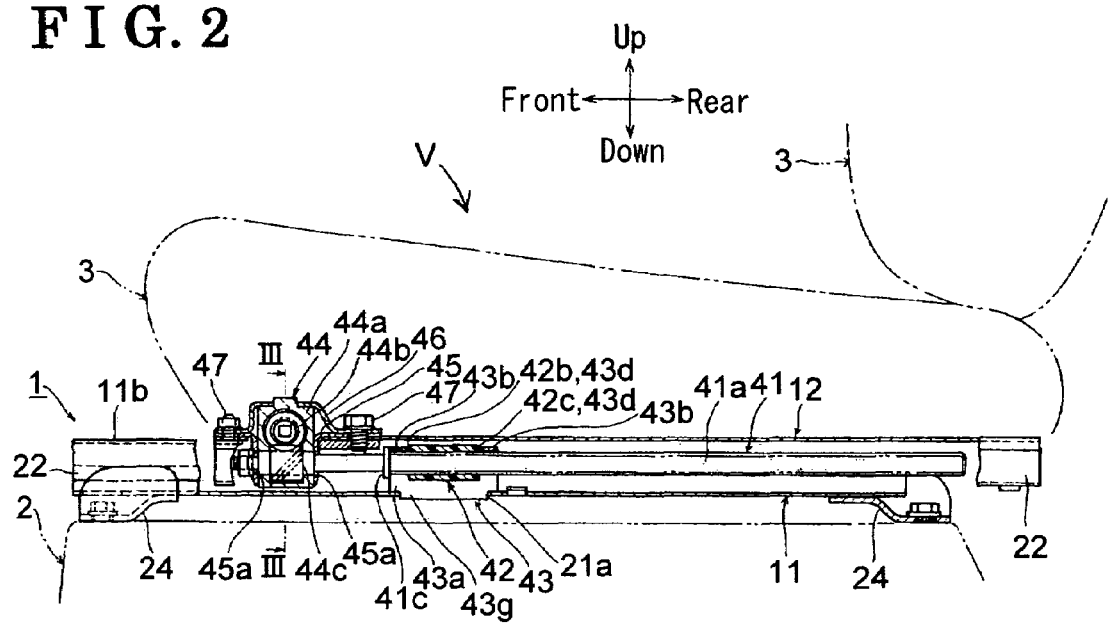
FIG. 2 is a sectional view illustrating the power seat slide apparatus mounted on a vehicle according to the first embodiment of the present invention.
Figure 3:
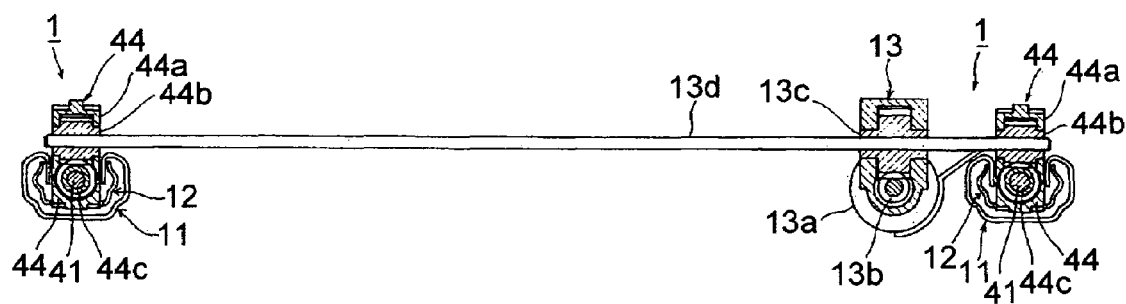
FIG. 3 is a sectional view taken along line III-III.

As illustrated in FIGS. 2 and 3, the gear unit 44 includes a gear box 44a, an input gear 44b and an output gear 44c, which are both housed inside the gear box 44a. A screw gear is employed as the input gear 44b and the output gear 44c, respectively. As for both the input gear 44b and the output gear 44c, the respective screw gears are designed with a torsion angle of approximately 45 degrees. The input gear 44b and the output gear 44c are assembled in the gear unit 44 so as to form a shaft angle of approximately 90 degrees. Therefore, the gear unit 44, which is configured as described above, can transform a rotational direction about a rotational axis extending in the lateral direction to a rotational direction about a rotational axis extending in the longitudinal direction.

According to the first embodiment of the present invention, by setting the number of teeth of the output gear 44c smaller than that of the input gear 44b, a diameter of the output gear 44c, which is housed inside the internal space 11a of the lower rail 11, can be downsized. Therefore, it is possible to restrain an expansion in a lateral length of the internal space 11a of the lower rail 1, which leads to restraining an increase in a size of the lower rail 11.

The gear box 44a is held tight between brackets 45 and 46, as illustrated in FIG. 1. The brackets 45 and 46 are secured to a front portion of the upper rail 12 by means of a fastening member 47 such as bolts and nuts. The gear unit 44 is hence supported at the front portion of the upper rail 12.

As illustrated in FIG. 1, the front end of the screw shaft 41 is inserted into insertion holes 45a of the bracket 45 and extends through the gear box 44a. A nut 48, which is screwed together with the screw shaft 41, is employed so as to prevent the screw shaft 41 from dropping out of the gear box 44a. The front end of the screw shaft 41 is formed with a serration portion 41b, which contributes to connect the screw shaft 41 to the output gear 44c and rotate the screw shaft 41 integrally with the output gear 44c.

The screw shaft 41 is welded with a contact portion 41c (FIG. 1) which is positioned ahead of the nut member 42 and extends in a radial direction of the screw shaft 41. When the upper rail 12 is moved rearward in response to a rotation of the screw shaft 41, the contact portion 41c of the screw shaft 41 comes in contact with front-end surfaces of the upper wall 43b, and the sidewalls 43a, of the housing 43, therefore enabling to restrain a rearward moving range of the upper rail 12.

Next, described below is a structure of the driving mechanism 13 with reference to FIGS. 1 and 3. The driving mechanism 13 is mainly configured with an electric motor 13a, a worm gear 13b and a worm wheel 13c of a speed reducing unit, and a connecting bar 13d (a rigid member). The worm gear 13b rotates integrally with a rotational shaft of the electric motor 13a, while the worm wheel 13c lowers a rotational speed of the worm gear 13b and transmits the reduced rotational speed to the connecting member 13d. The connecting member 13d, which is connected to the input gear 44b of the gear unit 44, transmits a rotational speed of the electric motor 13a, which was reduced by the worm gear 13b and the worm wheel 13c, to the input gear 44b. The connecting bar 13d of the driving mechanism 13, which is applied for both lateral power seat slide apparatus 1, is connected to the input gears 44b of the gear units 44 positioned at both sides of the seat 3.

In the power seat slide apparatus 1 for the vehicle V, the apparatus which is configured as described above, when the screw shaft 41 is rotated via the gear unit 44 by operating the electric motor 13a, the screw shaft 41 moves in an axial direction relative to the nut member 42 that is securely fixed to the lower rail 11 via the housing 43. As a result, the upper rail 12 is slidably moved relative to the lower rail 11. Accordingly, a longitudinal position of the seat 3 relative to the floor 2 can be adjusted. Further, the engagement between the screw shaft 41 and the nut member 42 restrains a slidable movement of the upper rail 12 to the lower rail 11, relative to a vehicle longitudinal directional load applied to the upper rail 12, thereby maintaining the vehicle seat 3 at an appropriate position.

Further, a front impact seat load, which is generated at a time when the vehicle V crashes ahead, or a rearward impact seat load, which is generated at a time when the vehicle V is impacted form a rearward, is transmitted to the floor 2 of the vehicle V from the seat 3 through the following passage. That is, when the front impact seat load is generated, the front impact seat load is transmitted to the nut member 42 that is screwed with the screw shaft 41. In this case, because the front surface 42b of the nut member 42 impacts with the notch end surfaces 43d and 43e, the front impact seat load is transmitted from the nut member 42 to the notch edge surfaces 43d and 43d. The front impact seat load is then transmitted from the housing 43 to the bottom wall 21 of the lower rail 11, and is further transmitted to the floor 2 of the vehicle V via the brackets 24.

When the rear impact seat load is generated, because the rear surface 42c of the nut member 42 impacts with the notch end surfaces 43d and 43e, the rear impact seat load is transmitted, via the notch end surfaces 43d and 43e, to the bottom wall 21 of the lower rail 11 and to the floor 2 of the vehicle V via the brackets 24. A direction, in which the front or rear impact seat load is transmitted, is substantially parallel to the upper wall 43b and the surfaces of the sidewalls 43a.

As described above, the following effects can be exerted according to the first embodiment of the present invention.

(1) The front or rear impact seat load is subjected from the nut member 42 to the notch end surfaces 43d and 43e of the housing 43. Therefore, in order to assure strength of the housing 43 to a certain level, the longitudinal dimension or length of the portion L1 of the housing 43 can be increased. Likewise, in addition or alternatively, in order to assure strength of the housing 43 to a certain level, the longitudinal dimension or length of the portion L2 of the housing 43 can be increased. In such case, it is possible to restrain an upsizing of a width dimension W of the housing 43, the upsizing which may be caused due to an expansion in a wall thickness of the housing 43. This can lead to restraining of an expansion of the internal space 11a of the lower rail 11. Therefore, the size of each rail 11 and 12 can be downsized. Since the width dimension W of the housing 43 can be restrained from being increased, as described above, a lateral length of the opening 11b of the lower rail 11 can be reduced, which can contribute improvement in an appearance of the lower rail 11, preventing foreign obstacles from dropping into the internal space 11a, and avoiding a shoes toe from getting dirty with foreign particles such as dirt.

(2) The welded portions 43g formed at lower end portions of the sidewalls 43a of the housing 43 are inserted into the through holes 21a of the bottom wall 21 of the lower rail 11 and are welded to the bottom wall 21. Therefore, the housing 43 can be welded to the lower rail 11 not only from the side of the internal space 11a of the lower rail 11 but also from an opposite side of the lower rail 11 relative to the internal space 11a. Moreover, when the welded portions 43g of the housing 43 are inserted into the through holes 21a of the lower rail 11, a position of the housing 43 for welding can be determined. Therefore, a welding performance of the housing 43 can be enhanced, and a positioning precision of the housing 43 relative to the lower rail 11 can be enhanced. Still moreover, the housing 43 can be fixed to the lower rail 11 more securely.

(3) The lower rail 11 possesses the reverse U-shaped cross section with the bottom wall 21 and the pair of sidewalls 22. Therefore, the lower rail 11 can be molded with high molding performance by press-forming a single plate member.

(4) When a vertical position of the rotational axis of the input gear 44b of the gear unit 44 is high, there may be a danger that the rotational axis interferes with the sidewalls 22 of the lower rail 11. When a diameter of the output gear 44c is large, it may leads to an expansion of the internal space 11a of the lower rail 11, and may increase a size of the rails 11 and 12. However, according to the first embodiment, because screw gears are employed as the input gear 44b and the output gear 44c, comparing with a structure in which worm gears are employed, the aforementioned problems can be solved, because a diameter of the output gear 44c can be reduced, and a rotational axis of the input gear 44b can be maintained at a certain height.

(5) Because a rotational speed inputted into the input gear 44b has been already reduced by the worm gear 13b and the worm wheel 13c, sliding movement friction of the input gear 44b and the output gear 44c can be reduced, which contributes to restraining of any problems that may relate to sliding noise, frictional heat and so on.

Second Embodiment

Figure 6:
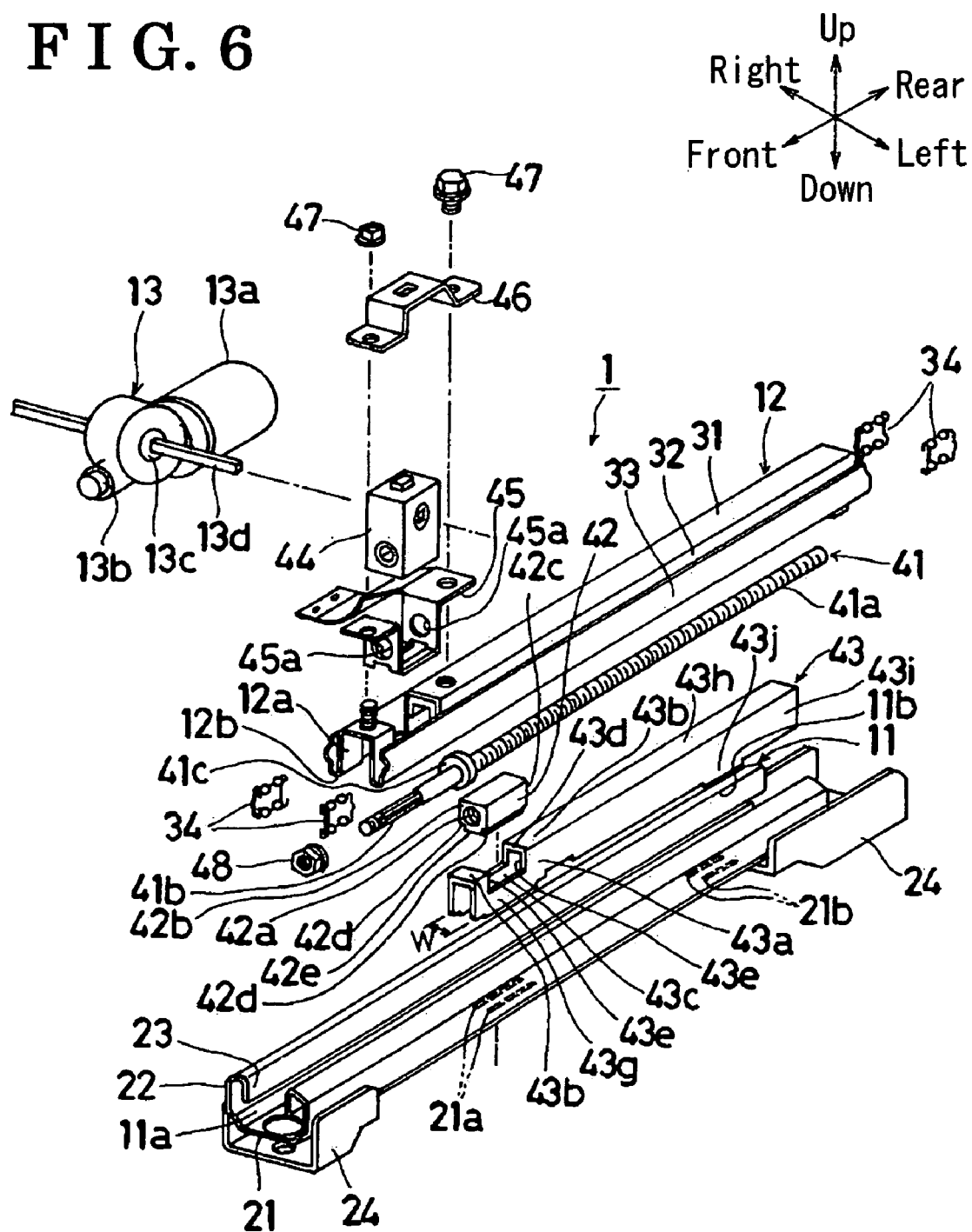
FIG. 6 is an exploded perspective view illustrating a power seat slide apparatus for a vehicle according to a second embodiment of the present invention.
Figure 7:
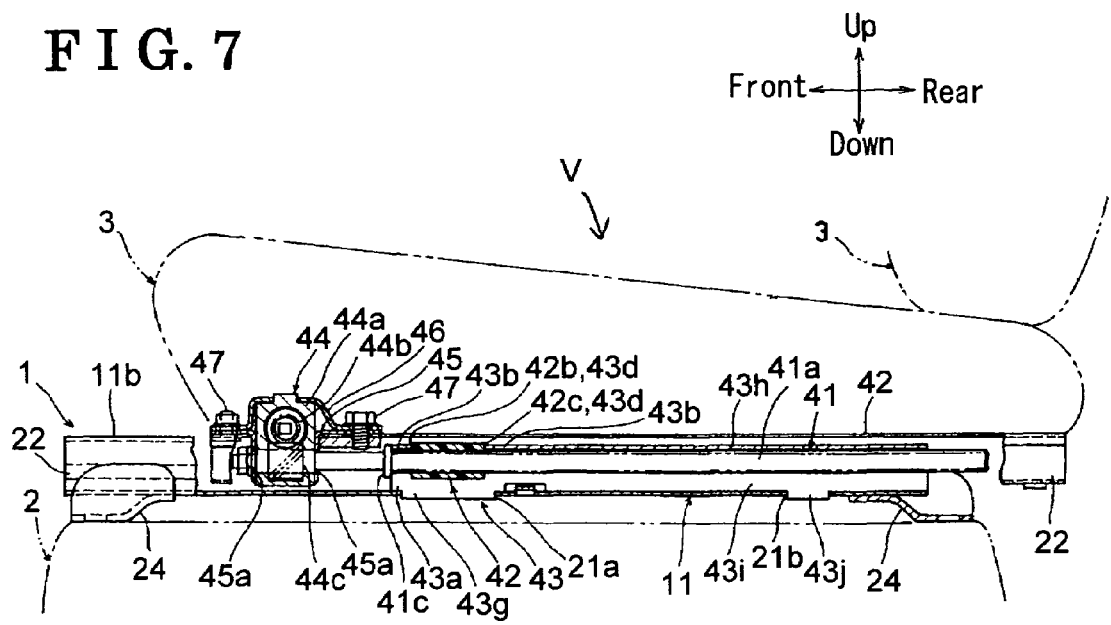
FIG. 7 is a sectional view illustrating the power seat slide apparatus mounted on a vehicle according to the second embodiment.

According to the first embodiment of the present invention, the portion L1, which is positioned ahead of the notch 43c, possesses substantially the same longitudinal direction as the longitudinal direction of the portion L2, which is positioned behind the notch 43c. However, according to a second embodiment, as illustrated in FIGS. 6 and 7, an extending portion 43h and extending portions 43i are integrally formed with the upper wall 43b and the side walls 43a respectively and extends therefrom to a rear end portion (i.e., one end) of the opening 11b of the lower rail 11. Therefore, a longitudinal area up to the rear end portion of the opening 11b is covered by the extending portions 43h and 43i, which can further improve an appearance of the lower rail 11, can further restrain foreign obstacles from dropping into the internal space 11a, and so on. Alternatively, the extending portions 43h and 43i can extend respectively from the upper wall 43b and the sidewalls 43a to a rear end portion (i.e., one end) of the lower rail 11, if the lower rail 11 does not possess the opening 11b.

At least one welded portion 43j can be formed at at least one lower end portion of the extending portions 43i and is inserted into at least one through hole 21b of the bottom wall 21 of the lower rail 11. The welded portion 43j being inserted into the through hole 21b is welded to the bottom wall 21 of the lower rail 11. According to the second embodiment of the present invention, welded portions 43j are formed at lower end portions of the extending portions 43i and are inserted into two through holes 21b of the bottom wall 21 of the lower rail 11. The welded portions 43j being inserted into the through holes 21b are welded to the bottom wall 21 of the lower rail 11.

The structure of the power seat slide apparatus 1 according to the second embodiment is substantially the same as that of the first embodiment, apart from the extending portions 43h and 43i and the through holes 21b. Therefore, the same reference numerals can be applied to the same elements, respectively, and the description according to the first embodiment can be referred to for the same elements.

Third Embodiment

Figure 8:
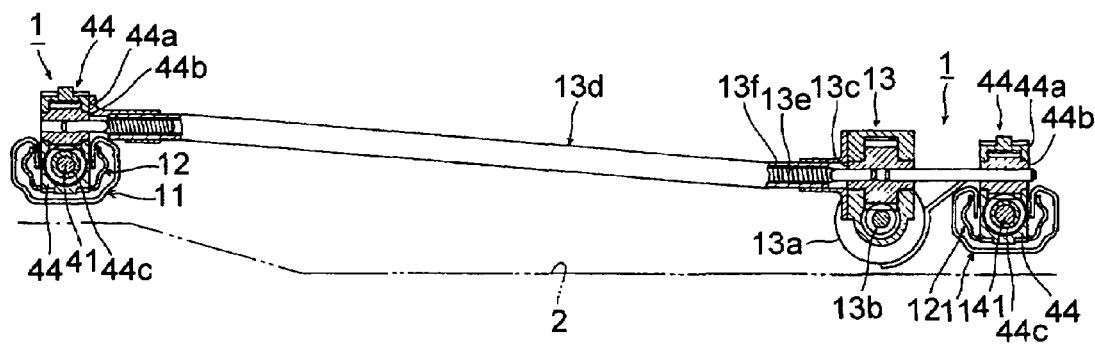
FIG. 8 is a sectional view illustrating a power seat slide apparatus mounted on a vehicle according to a third embodiment.
Figure 9:
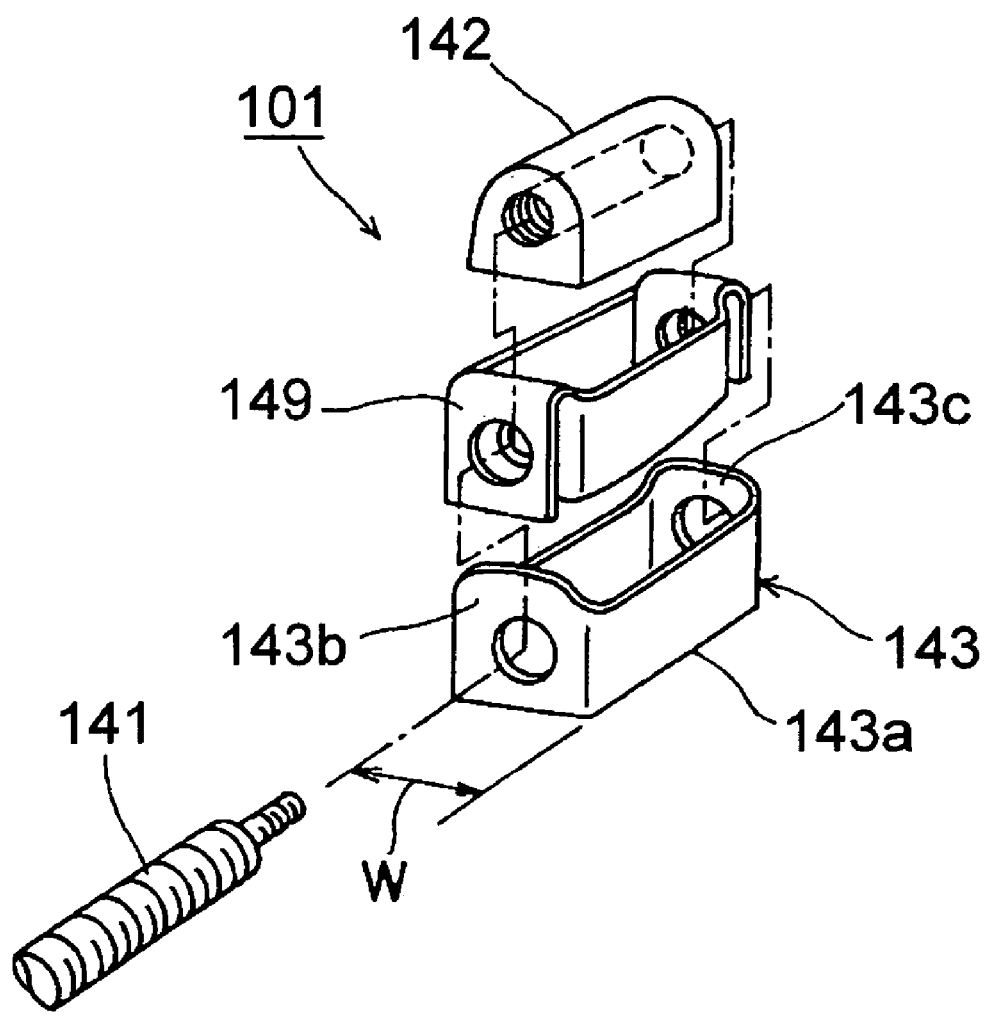
FIG. 9 is an exploded perspective view illustrating a conventional power seat slide apparatus.

A single rigid member is employed as the connecting bar 13d according to the first embodiment of the present invention. According to a third embodiment, as illustrated in FIG. 8, the connecting bar 13d is substituted by a structure having an inner cable 13e and an outer tube 13f supporting the inner cable 13e therein. The inner cable 13e is made of twisted steel wires, and the outer tube 13f is made of a resin having flexibility. The outer tube 13f freely slidably supports the inner cable 13e therein.

According to the aforementioned structure having the inner cable 13e and the outer tube 13f, even if the input gears 44b of the gear units 44 are position at laterally different heights on a floor having a step as illustrated in FIG. 8, driving force of the single driving mechanism 13 can be transmitted easily to the gear units 44 positioned at the both lateral sides.

The structure of the power seat slide apparatus 1 according to the third embodiment is substantially the same as that of the first embodiment, apart from the inner cable 13e and the outer tube 13f. Therefore, the same reference numerals can be applied to the same elements, respectively, and the description according to the first embodiment can be referred to for the same elements.

Other Embodiments

According to the first, second and third embodiments of the present invention, the nut member 42 is assembled to the housing 43 in a directly contact state. A shock-absorbing member can be interposed between the nut member 42 and the housing 43 so as to reduce an impact noise between the nut member 42 and the housing 43. Alternatively or in addition, a contact member such as a washer can be interposed between the nut member 42 and the housing 43 so as to transmit a load from the nut member 42 to the notch end surfaces 43d and 43e with high reliability.

According to the second embodiment, the extending portion 43h and the extending portions 43i are integrally formed at the upper wall 43b and the sidewalls 43a respectively. Alternatively or in addition, the extending portion 43h can be a separated member from the upper wall 43 and can be attached to the upper wall 43b. Likewise, the extending portions 43i can be separated members from the sidewalls 43a and can be attached to the sidewalls 43a.

According to the second embodiment, the extending portion 43h are provided at the upper wall 43b, while the extending portion 43i are provided at the pair of sidewalls 43a. Still alternatively or in addition, only the extending portion 43h can be provided at the upper wall 43b, while the extending portions 43i, which extends from the sidewalls 43a, are not provided.

According to the above-described embodiments, the lower rail 11 serves as the first rail, while the upper rail 12 serves as the second rail. However, the upper rail 12 can be fixed to the floor 2 of the vehicle V as the first rail, and the lower rail 11 can be fixed to the seat 3 as the second rail. In this case, the housing 43, the nut member 42 the brackets 24 can be secured to the upper rail 12.

when a seat belt is supported not by a pillar of the vehicle V but by the seat 3 of the vehicle V, a front impact seat load or a rear impact seat load, which is applied to the seat 3, may be increased. If the upper rail 12 described above is employed for the aforementioned type seat 3, the above-described effects can be exerted remarkably and an occupant seated on the seat 3 can obtain a good feeling.

According to the above-described embodiments, each of the lower rail 11 and the upper rail 12 possesses an approximately reverse U-shaped cross section. However, at least one of the lower rail 11 and the upper rail 12 can possess an approximately L-shaped cross section.

As described above, according to the above-described embodiments, the following effects can b exerted.

The housing 43 possess a reverse U-shaped cross section having the upper wall 43b and the pair of sidewalls 43a. The nut member 42 is held tight in the longitudinal direction of the vehicle V by the first notch end surfaces 43d of the upper wall 43b and the second notch end surfaces 43e of the pair of sidewalls 43a. Therefore, a seat load, which is transmitted from the nut member 42 to the housing 43, is subjected to the notch end surfaces 43d and 43e of the housing 43. Therefore, in order to assure a strength of the housing 43 to a certain level, the longitudinal dimension or length of the portion L1 of the housing 43 can be increased, likewise, the longitudinal dimension or length of the portion L2 of the housing 43 can be increased. In such case, there is no need to increase a wall thickness of the housing 43. This sort of effects can be exerted because such seat load is applied to the wall surfaces of the bottom wall and the sidewalls of the housing 43 substantially horizontally along the longitudinal direction of the vehicle V, comparing with the conventional housing structure illustrated in FIG. 1, according to which a seat load is applied vertically to the front wall 143b and the rear wall 143c of the housing 143.

Further, it is possible to restrain an upsizing of a width dimension W of the housing 43, the upsizing which may be caused due to an expansion in a wall thickness of the housing 43. This can lead to restraining of an expansion of the internal space of the lower rail 11. Therefore, the size of each rail 11 and 12 can be downsized, and an increase in a manufacturing cost can be restrained. Because the expansion of the width dimension W of the housing 43 can be restrained, as described above, the opening 11b of the lower rail 11 can be downsized, which can contribute improvement in an appearance of the lower rail 11, preventing foreign obstacles from dropping into the internal space 11a.

Still further, the housing 43 can be welded to the lower rail 11 not only from the side of the internal space 11a of the lower rail 11 but also from an opposite side of the lower rail 11 relative to the internal space 11a. Moreover, when the welded portions 43g of the housing 43 are inserted into the through holes 21a of the lower rail 11, a position of the housing 43 for welding can be determined. Therefore, a welding performance of the housing 43 can be enhanced, and a positioning precision of the housing 43 relative to the lower rail 11 can be enhanced. Still moreover, the housing 43 can be fixed to the lower rail 11 more securely.

Still further, the extending portion 43h integrally formed at the upper wall 43b of the housing 43 covers a longitudinal area of the lower rail 11 up to a rear end of the opening 11b of the lower rail 11. Therefore, it is possible to further improve an appearance of the lower rail 11, can further restrain foreign obstacles from dropping into the internal space 11a, and so on.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A power seat slide apparatus for a vehicle comprising:
a first rail fixedly mounted on a floor of a vehicle and extending in a longitudinal direction of the vehicle;
a second rail fixed to a seat and slidably supported by the first rail;
a housing made of a metal and fixedly mounted on the first rail, the housing possessing a reverse U-shaped cross section projecting upwardly with an upper wall, which extends in the longitudinal direction of the vehicle and forms an upper surface of the reverse U-shaped cross section, and first and second sidewalls, which extend from a right side, and a left side, of the upper wall along the longitudinal direction of the vehicle and forms side surfaces of the reverse U-shaped cross section, and the housing further including a notch defined by a first notch end surface of the upper wall and a second notch end surface of the first and second sidewalls;
a nut member made of a resin, fitted into the notch of the housing and supported inside the housing, and the nut member being held tight in the longitudinal direction of the vehicle by the first notch end surface of the upper wall and the second notch end surface of the first and second sidewalls;
a screw shaft extending above the first rail along the longitudinal direction of the vehicle, the screw shaft being freely rotatably supported by the second rail and being engaged with the nut member; and
a driving mechanism operatively associated with the second rail so as to rotate the screw shaft,
wherein the screw shaft is rotated relative to the nut member in response to an operation of the driving mechanism, and the second rail is slidably moved in the longitudinal direction of the vehicle relative to the first rail when the screw shaft, which is engaged with the nut member, is rotated.

2. A power seat slide apparatus for a vehicle according to claim 1, wherein the first rail includes an internal space, which extends in the longitudinal direction of the vehicle, and an opening which opens an upper portion of the internal space in the longitudinal direction, and the housing is inserted into the internal space of the first rail via the opening and is secured to the first rail.

3. A power seat slide apparatus for a vehicle according to claim 1, wherein at least one of the first sidewall, and the second sidewall, of the housing includes a lower end portion, and the lower end portion is inserted into a through hole formed at the first rail and is fixedly welded to the first rail.

4. A power seat slide apparatus for a vehicle according to claim 2, wherein at least one of the first sidewall, and the second sidewall, of the housing includes a lower end portion, and the lower end portion is inserted into a through hole formed at the first rail and is fixedly welded to the first rail.

5. A power seat slide apparatus for a vehicle according to claim 1, wherein the upper wall of the housing is provided with an extending portion that extends to one end of the first rail.

6. A power seat slide apparatus for a vehicle according to claim 2, wherein the upper wall of the housing is provided with an extending portion that extends to one end of the opening of the first rail.

7. A power seat slide apparatus for a vehicle according to claim 4, wherein the upper wall of the housing is provided with an extending portion that extends to one end of the opening of the first rail.

8. A power seat slide apparatus for a vehicle according to claim 1, wherein a wall thickness of the housing is equal to or greater than 1.6 mm and equal to or smaller than 3.2 mm.

9. A power seat slide apparatus for a vehicle according to claim 1, wherein at least one of a longitudinal-directional dimension of a first portion, which is positioned ahead of the notch, and a longitudinal-directional dimension of a second portion, which is positioned behind the notch, is equal to or greater than 5 mm and equal to or smaller than 20 mm.

10. A power seat slide apparatus for a vehicle according to claim 1, wherein the nut member is a box-shaped structure.

11. A power seat slide apparatus for a vehicle according to claim 1, wherein at least one of a front surface, and a rear surface, of the nut member comes in contact with the notch end surfaces of the housing.

12. A power seat slide apparatus for a vehicle according to claim 1, wherein a right-and-left directional dimension of the nut member is slightly greater than a length between the first sidewall and the second sidewall of the housing.

13. A power seat slide apparatus for a vehicle according to claim 1, wherein a protrusion from a bottom surface of the nut member is interposed between the first and second sidewalls of the housing.

14. A power seat slide apparatus for a vehicle according to claim 1, wherein at least one of the first sidewall, and the second sidewall, of the housing includes at least one lower end portion, the lower end portion is formed with a welded portion, and the welded portion is inserted into a through hole formed at a bottom wall of the first rail.

15. A power seat slide apparatus for a vehicle according to claim 1, further comprising;
a gear unit which is operatively associated with the screw shaft;
the driving mechanism including;
a worm gear;
a worm wheel engaged with the worm gear;
a connecting bar which rotates integrally with the worm wheel, the connecting bar being connected to the screw shaft via the gear unit.

16. A power seat slide apparatus for a vehicle according to claim 15, wherein the gear unit includes: an input gear engaged with the connecting bar; and an output gear engaged with the input gear and the screw shaft, the input gear and the output gear respectively possess a torsion angle of 45 degrees, and the input gear and the output gear form a shaft angle of 90 degrees.

17. A power seat slide apparatus for a vehicle according to claim 16, wherein a number of teeth of the output gear is smaller than a number of teeth of the input gear.

18. A power seat slide apparatus for a vehicle according to claim 2, wherein the upper wall, the first and second sidewalls of the housing extend to one end of the opening of the lower rail.

19. A power seat slide apparatus for a vehicle according to claim 1, further comprising;
a gear unit which is operatively associated with the screw shaft;
the driving mechanism including;
a worm gear;
a worm wheel engaged with the worm gear;
a connecting bar which rotates integrally with the worm wheel and possess flexibility, the connecting bar being connected to the screw shaft via the gear unit.

20. A power seat slide apparatus for a vehicle according to claim 19, wherein the connecting bar includes:
an inner cable made of twisted steel wires; and
an outer tube supporting the inner cable therein and made of a resin having flexibility.

* * * * *